United States Patent
Kliesch et al.

(10) Patent No.: US 8,945,703 B2
(45) Date of Patent: Feb. 3, 2015

(54) SINGLE- OR MULTILAYER, STABILIZED POLYESTER FILM

(75) Inventors: Holger Kliesch, Ginsheim-Gustavsburg (DE); Oliver Klein, Ockenheim (DE); Andreas Bork, Wiesbaden (DE); Ingo Fischer, Heistenbach (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 674 days.

(21) Appl. No.: 12/832,126

(22) Filed: Jul. 8, 2010

(65) Prior Publication Data

US 2011/0008635 A1  Jan. 13, 2011

(30) Foreign Application Priority Data

Jul. 13, 2009 (DE) .................. 10 2009 032 820

(51) Int. Cl.

| | | |
|---|---|---|
| B32B 27/18 | (2006.01) | |
| B32B 27/36 | (2006.01) | |
| B32B 37/15 | (2006.01) | |
| C07D 221/06 | (2006.01) | |
| C07D 221/14 | (2006.01) | |
| C08K 5/101 | (2006.01) | |
| C08K 5/16 | (2006.01) | |
| C08K 5/34 | (2006.01) | |
| C08K 5/3412 | (2006.01) | |
| C08K 5/3432 | (2006.01) | |
| C08K 5/3437 | (2006.01) | |
| C08K 5/3467 | (2006.01) | |
| C08K 5/3477 | (2006.01) | |
| C08K 5/3492 | (2006.01) | |
| C08K 5/3495 | (2006.01) | |
| C08K 5/132 | (2006.01) | |
| C08K 5/32 | (2006.01) | |
| C08L 67/02 | (2006.01) | |
| C08J 5/18 | (2006.01) | |
| B32B 27/20 | (2006.01) | |

(52) U.S. Cl.
CPC .............. *B32B 27/36* (2013.01); *B32B 27/20* (2013.01); *C08J 5/18* (2013.01); *C08K 5/3437* (2013.01); *C08J 2367/02* (2013.01); *Y10S 428/91* (2013.01)
USPC ...... 428/212; 428/480; 428/910; 264/173.12; 264/173.15; 264/288.4; 264/290.2; 524/86; 524/87; 524/89; 524/91; 524/92; 524/95; 524/99; 524/100; 524/358; 546/79; 546/98

(58) Field of Classification Search
None
See application file for complete search history.

(56) References Cited

U.S. PATENT DOCUMENTS

| | | | | |
|---|---|---|---|---|
| 3,989,698 | A  * | 11/1976 | Jacobs et al. .................... 544/92 |
| 4,446,262 | A  * | 5/1984 | Okumura et al. ................ 524/89 |
| 5,098,790 | A  * | 3/1992 | Diemunsch et al. .......... 428/412 |
| 6,436,219 | B1 * | 8/2002 | Francis et al. ........... 156/244.11 |
| 6,521,351 | B2 * | 2/2003 | Murschall et al. ............. 428/480 |
| 6,593,406 | B2 * | 7/2003 | Sargeant et al. ............... 524/186 |
| 6,613,819 | B2 * | 9/2003 | Johnson et al. ................ 524/100 |
| 6,773,104 | B2 * | 8/2004 | Cornelius et al. ............. 347/106 |
| 6,863,954 | B2 * | 3/2005 | Peiffer et al. .................. 428/141 |
| 6,869,991 | B2 * | 3/2005 | Murschall et al. .............. 524/91 |
| 6,936,350 | B2 * | 8/2005 | Murschall et al. ............. 428/480 |
| 7,189,452 | B2 * | 3/2007 | Kiehne et al. .............. 428/319.7 |
| 7,238,419 | B2 * | 7/2007 | Kern et al. ..................... 428/328 |
| 7,255,928 | B2 * | 8/2007 | MacKerron et al. .......... 428/480 |
| 7,714,044 | B2 * | 5/2010 | Schambony et al. ........... 524/89 |
| 7,968,151 | B2 * | 6/2011 | Chilla et al. ................... 427/409 |
| 2002/0041437 | A1* | 4/2002 | Cornelius ..................... 359/361 |
| 2005/0171252 | A1* | 8/2005 | Schambony et al. ........... 524/90 |
| 2007/0100033 | A1* | 5/2007 | Schambony et al. ......... 524/100 |
| 2009/0030119 | A1* | 1/2009 | Sarkar ............................. 524/87 |
| 2009/0061137 | A1 | 3/2009 | Konrad et al. | |
| 2009/0061138 | A1 | 3/2009 | Peiffer et al. | |

FOREIGN PATENT DOCUMENTS

| | | |
|---|---|---|
| DE | 101 35 795 A1 | 4/2002 |
| EP | 0 849 075 A2 | 6/1998 |
| EP | 1 127 912 A1 | 8/2001 |
| EP | 1 371 682 A2 | 12/2003 |
| EP | 1 380 414 A1 | 1/2004 |
| EP | 1 529 799 A2 | 11/2005 |
| JP | 2003-029537 * | 1/2003 |
| JP | 2004-258153 * | 9/2004 |
| WO | WO 98/06575 A1 | 2/1998 |
| WO | WO 02/070606 A1 | 9/2002 |
| WO | WO 2005/047265 A1 | 5/2005 |

* cited by examiner

*Primary Examiner* — Vivian Chen
(74) *Attorney, Agent, or Firm* — ProPat, L.L.C.

(57) ABSTRACT

The invention relates to a polyester film incorporating at least one UV stabilizer of the formula I,

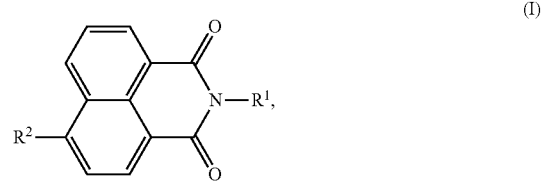

in which
$R^1$ is hydrogen, alkyl, alkenyl, cycloalkyl, cycloalkenyl, heterocycloalkyl, aryl, or heteroaryl, and
$R^2$ is a moiety which contains at least one π-electron system, which contains a carbon atom and at least one further atom selected from carbon, oxygen, and nitrogen, where the moiety $R^2$ contains at least one atom different from carbon, where the film includes at least one further UV absorber which does not correspond to the formula I. The invention further relates to a process for producing the film, and also to articles formed from the film.

18 Claims, No Drawings though these are used not only for polyester (UV 3638 from Cytec from the benzoxazine class, for example, is used in polyamides/polyolefins; Hostavin B-CAP from Clariant from the benzoxazine class is used in polyolefins/PVC).

SINGLE- OR MULTILAYER, STABILIZED POLYESTER FILM

CROSS-REFERENCE TO RELATED APPLICATIONS

This application claims priority to German Patent Application No. 10 2009 032 820.3 filed Jul. 13, 2009 which is hereby incorporated herein by reference in its entirety.

FIELD OF THE INVENTION

The invention relates to a single- or multilayer polyester film which has very low transparency for UV light from 320 to 400 nm. The invention further relates to a process for producing the film and to the use of the film.

BACKGROUND OF THE INVENTION

UV stabilizers (the terms UV stabilizer and UV absorber are synonymous within this specification) for polymers are known within the prior art and in essence derive from the following groups of substances: triazines, benzotriazoles, benzophenones, sterically hindered amines (Hals=hindered amine light stabilizer), and from many other groups. An example of a list is found in DE-A-10135795, (whose United States equivalent is United States Patent Application Publication No. 2002/083641A1). The UV stabilizers of interest here have the task of protecting the polyester from the effects of UV radiation, and they moreover also provide protection from UV light to the products located behind the film in the path of the radiation. UV-stabilized, oriented polyester films are known, and the particular effectiveness of stabilizers from the triazines class has likewise been described, for example in WO-A-1998/06575.

A disadvantage common to most of those members of the abovementioned absorber groups that are suitable for polyesters is that their absorption decreases sharply as wavelength rises in the range from 360-400 nm, and concentrations that are of interest commercially (up to a maximum of 5% by weight) generally lead to transparency >40% above wavelengths as low as 390 nm in unfilled clear polyester films (<0.5% particle-fill level) (transparency and transmittance being synonymous within this specification). The region above 320 nm is of no importance for stabilizing polyethylene terephthalate film itself, since polyethylene terephthalate has ceased to absorb at that wavelength; even film comprising polyethylene naphthalate has almost no remaining absorption above 360 nm, and is therefore not damaged by light of those wavelengths. However, the position is different in the case of many other organic materials, such as printing inks, vitamins, fats, flavors, natural dyes, etc. Some of these absorb very strongly in the range from 360 to 400 nm and correspondingly are subject to severe damage caused by these wavelengths. It is therefore desirable to protect substances of this type by using films which provide maximum shielding in said range. In contrast, strong absorption by the film above 400 nm is mostly not desired, since this gives the film an undesired coloring.

Substituted naphthalene-1,8-dicarboxylic monoimides are a relatively new class of commercially available UV absorbers. Compounds of this type, and their use in polyesters, have been described inter alia in WO-A-2005/047265 A1, whose United States equivalents are United States Application Publication No 2005/0171252 A1; United States Application Publication No. 2007/0100033 A1; and U.S. Pat. No. 7,714,044 B2. Each of WO-A-2005/047265 A1; United States Application Publication No. 2005/0171252 A1; United States Application Publication No. 2007/0100033 A1; and U.S. Pat. No. 7,714,044 B2 is incorporated herein by reference in its entirety.

Said specification describes the use of naphthalene-1,8-dicarboxylic monoimides alone or in combination with other UV absorbers. UV absorbers that may be mentioned for additional use are benzotriazoles, triazines and diphenylcyanoacrylates. Other classes of stabilizer, e.g. benzoxazines, are not mentioned, but a plurality of compounds from the sector of the benzotriazoles and diphenylcyanoacrylates are mentioned as suitable. Examples mentioned are not only 100% of naphthalene-1,8-dicarboxylic monoimide in examples 25-27 but also a combination with diphenylcyanoacrylate in example 28.

Napthalene-1,8-dicarboxylic monoimides of structure I-C (in particular I-C.1-10) in WO-A-2005/047265 have markedly higher absorption concentrations of from 0.1 to 5% by weight in polyester films of thickness from 8 to 200 µm than most other known commercially available UV stabilizers from the triazines, benzotriazoles, benzophenones, benzoxazines, or diphenylcyanoacrylates groups. However, their absorption decreases markedly below 350 nm, and since the intrinsic absorption of polyester films of said thickness makes a significant contribution only below 320 nm, there is a resultant unprotected gap within the UV-A region.

Furthermore, compounds of the structure I-C of WO-A-2005/047265 exhibit an intensive bluish violet fluorescence in polyester films. This is actually mentioned in WO-A-2005/047265 and is described as favorable for yellowness index reduction. However, this fluorescence is unwanted in, or even prevents use of, polyester films for food-and drink-packaging, and this also applies to films for other applications which involve some degree of printing, because it generates an extremely "synthetic" impression, and when the average user who "dislikes chemicals" sees this he/she can be reluctant to purchase. In printed applications, the fluorescence causes a color shift or an unwanted "color" in the unprinted regions.

SUMMARY OF ADVANTAGEOUS EMBODIMENTS OF THE INVENTION

It was an object of the present invention to provide an at least monoaxially stretched polyester film, preferably of thickness in the range from 6 to 150 µm, which has transparency below 90% at 400 nm, transparency below 50% at 390 nm, transparency below 20% at 360 nm and transparency below 30% at 330 nm. The film is moreover intended to suffer no visible impairment caused by fluorescence at from 400 to 700 nm (visible region). The film is further intended to be capable of economic production, i.e. to exhibit a number of break-offs which is within the range for unstabilized films of comparable thickness, and not to cause any significant unpleasant odor during the production process.

DETAILED DESCRIPTION OF ADVANTAGEOUS EMBODIMENTS OF THE INVENTION

Said object is achieved via use of UV stabilizers of the following structural formula I (naphthalene-1,8-dicarboxylic monoimides) in polyester films, where at least one further UV absorber is present which does not correspond to formula I (e.g. from the triazines, benzophenones, diphenylcyanoacrylates, benzotriazoles, or benzoxazines group),

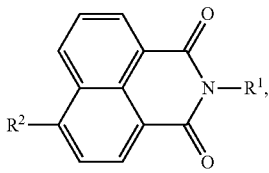

(I)

in which
R¹ is hydrogen, alkyl, alkenyl, cycloalkyl, cycloalkenyl, heterocycloalkyl, aryl, or heteroaryl, and
R² is a moiety which contains at least one π-electron system, which contains a carbon atom and at least one further atom selected from carbon, oxygen, and nitrogen, where the moiety R² contains at least one atom different from carbon.

Pages 4 to 9 of WO-A-2005/047265 (which corresponds to U.S. Pat. No. 7,714,044 B2 at Col. 4, line 1 through Col. 8, line 55) give a more detailed explanation of the abovementioned moieties (alkyl, alkenyl, cycloalkyl, cycloalkenyl, heterocycloalkyl, aryl or heteroaryl) and the π-electron system.

Among the substituents R¹ set out in more detail in WO-A-2005/047265, preference is given to those which have a molar mass >29 g/mol and particularly preferably >77 g/mol, since the result is improved binding into the polyester matrix. In one preferred embodiment moreover R¹ has at least one aromatic system, for the same reason.

In one preferred embodiment, R² corresponds to a substituted phenoxy moiety, as described for compound group I-C in WO-A-2005/047265 (as well as in U.S. Pat. No. 7,714,044 B2),

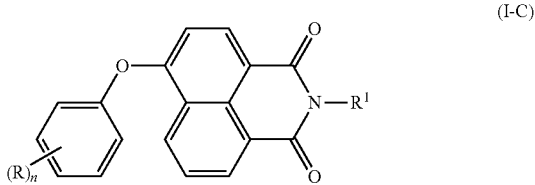

(I-C)

in which
R¹ is defined as above,
R is identical or different C₁-C₁₂-alkyl groups; and
n is 1, 2, 3, 4, or 5.

Substituents other than those defined above at R² usually give stabilizers which have relatively low absorption at from 390 to 400 nm in polyester films and thus increase costs, or which lead to an increased number of problems within the production process, e.g. break-offs, etc., by virtue of the relatively large concentration of stabilizers necessary to achieve the abovementioned absorption ranges (effect on capability for economic production).

Particular preference is given to compound I-C.1 of WO-A-2005/047265 (likewise provided in U.S. Pat. No. 7,714,044 B2)

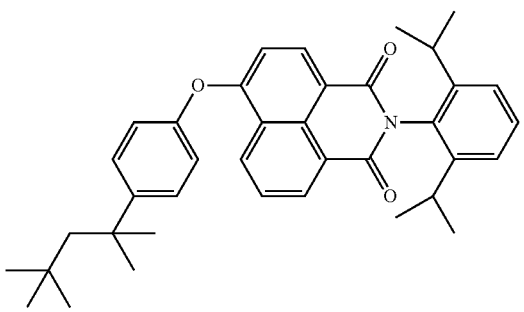 [SMILES: CC(C)c1cccc(C(C)C)c1N1C(=O)c2cccc3c(Oc4ccc(C(C)(C)CC(C)(C)C)cc4)ccc(c23)C1=O]

Compound I-C.1: N-(2,6-diisopropylphenyl)-6-[4-(1,1,3,3-tetramethylbutyl)phenoxy]-1H-benzo[d,e]-isoquinoline-1,3(2H)-dione The concentration of the UV absorbers of formula I in the film of the invention depends here on the thickness of the film and is selected in such a way as to provide adequate UV absorption in the range from 360 to 400 nm, in combination with the second UV absorber (see below for details in this connection). An excessive amount of absorber impairs the cost-effectiveness of production of the film and moreover tends to cause an increased level of absorber-related gas evolution from the film.

It has proven to be cost-effective and also effective for UV-absorption purposes that the film-thickness-standardized concentration of UV stabilizers of the formula I in percent by weight (and when two or more different compounds from the group of the UV stabilizers of the formula I are used, "concentration" means the total concentration of all of the compounds of the formula I) complies with the following Equation 1:

$$C_{nI} = C_I \cdot d \qquad \text{Equation 1}$$

where
d=film thickness (unit: μm)
$C_I$=total concentration of all of the compounds of the formula I in the film (unit: % by weight)
$C_{nI}$=standardized total concentration of all of the compounds of the formula I in the film (unit: % by weight·μm)

Unless otherwise stated, all of the concentrations $C_I$ and $C_{nI}$ stated are based on the entire film.

The lower limit of $C_{nI}$ is usually ≥4% by weight·μm, preferably ≥6% by weight·μm, particularly preferably ≥10% by weight·μm, and ideally ≥18% by weight·μm. The upper limit of $C_{nI}$ is usually ≤60% by weight·μm, preferably ≤48% by weight·μm, particularly preferably ≤35% by weight·μm and ideally ≤26% by weight·μm.

The thickness of the film is advantageously from 6 to 150 μm, preference being given to from 8 to 50 μm and particularly from 10 to 23 μm.

The film comprises, alongside the UV stabilizers described via formula I, at least one further UV absorber which is not described via said formula. In one preferred embodiment, the second UV absorber has at least one absorption maximum above 340 nm. The second UV absorber here is preferably a triazine, a benzotriazole, a benzophenone, a diphenylcyanoacrylate, or a benzoxazine. Particular preference is given to triazines (in particular triphenyltriazine derivatives) and benzoxazines, or a combination thereof. Particular preference is given to 2-(4,6-diphenyl-1,3,5-triazin-2-yl)-5-[(hexyl)oxy]phenol (available commercially as TINUVIN® 1577 from Ciba SC/Switzerland) and in particular 2,2'-(1,4-phenylene)bis[4H-3,1-benzoxazin-4-one], available commercially as CYASORB® UV-3638 (Cytex USA). These UV stabilizers have high absorption in the range from 320 to 400 nm, in particular in the regions in which UV stabilizers of the structural formula I in the concentrations of the invention do not have adequate absorption, and they therefore fill the spectral gaps. Surprisingly, moreover, the compounds mentioned have good suitability for suppressing the fluorescence of UV stabilizers of the structural formula I. In principle, this also applies to a wide variety of other UV stabilizers, but these often have other disadvantages and are therefore less preferred.

Many benzophenones, e.g. 2-hydroxy-4-methoxybenzophenone (CYASORB® UV-9 from Cytec USA), and also benzotriazoles, such as 2-(2'-hydroxy-5'-octylphenyl)benzotriazole (CYASORB® UV-5411) have very high volatility at the processing temperatures around 300° C. which are typical for polyesters and therefore cause heavy evolution of gas in the production area and are in particular considered problematic in packaging films for food or drink because they also exhibit relatively strong tendency toward migration out of the polyester, and these compounds are therefore less preferred.

Many UV absorbers, such as 2,2'-methylenebis(6-(2H-benzotriazol-2-yl)-4-1,1,3,3-tetramethylbutyl)phenol (TINUVIN® 360, Ciba Switzerland) are not approved for use in films for food- and drink-packaging and are therefore less preferred for the purposes of the invention, since they would severely restrict the potential commercial use of the film. Others, such as UVINUL® 3030 (1,3-bis[2'-cyano-3',3-diphenylacryloyl)oxy]-2,2-bis{[2-cyano-3',3'-diphenyl-acryloyl)oxy]methyl}propane, BASF, Germany) do not suppress the fluorescence of the UV absorbers of the formula I until very high concentrations have been reached and these are therefore less preferred for the purposes of the invention.

In one preferred embodiment, the concentrations added of the additional UV stabilizers mentioned are from 5 to 400% by weight, particularly preferably from 10 to 200% by weight, and ideally from 20 to 100% by weight, of the concentration of UV absorbers I. These data are based on the total concentration of all of the other UV absorber/stabilizers. By way of example, this means that the total concentration in % by weight of all of the other UV absorbers/stabilizers is ideally from 0.2 to 1.0% by weight if the concentration of UV absorber of the formula I is 1% by weight.

The film has one or more layers, and all of the starting materials mentioned can have been distributed independently of one another within the layers. In one preferred embodiment, the film has at least three layers. In one particularly preferred embodiment, the film has at least three layers and the respective external layers of the film comprise no UV absorber of the formula I. There is therefore particularly little migration of the compounds of the formula I out of the film.

It has moreover proven advantageous that at least one layer in the direction of incident light, above the layer(s) that comprise(s) compounds of the formula I, comprises further UV stabilizers as described above (not corresponding to the formula I). The result is a particularly marked reduction in the fluorescence of the compounds I. It has moreover proven advantageous that the layer(s) which comprise(s) the compounds of the formula I likewise comprise(s) further UV stabilizers. Surprisingly, the resultant fluorescence is less than that from structures in which the entire amount of the stabilizer was present in layers in the direction of the incident light above the layer(s) comprising the compounds of the formula I. It has proven advantageous here that the entire amount of further UV stabilizers/absorbers in a layer comprising compounds of the formula I amounts to at least 5% (based on % by weight) of the amount of compounds of the formula I. A layer which comprises 1% by weight of compounds of formula I therefore also comprises, in said preferred embodiment, at least 0.05% by weight of other UV stabilizers.

If the requirements include not only the UV-protection function of materials which, in the direction of incident light, are behind the film but also UV stabilization of the actual film, it has proven advantageous in the case of multilayer film that the outer layer facing toward the light (or in the case of bilateral illumination and at least three-layer films, both of the outer layers) comprise(s) a UV stabilizer, which moreover preferably does not correspond to formula I. Particular preference is given to the use of triazine stabilizers (in particular triphenyltriazine derivatives, such as TINUVIN® 1577) in these layers. Said layers then preferably comprise more than 0.5% by weight of stabilizer.

In principle, the same polyesters can be used in all of the layers, but it is also possible to use various polyesters in the different layers.

The film, that is to say the straight polymer content of the film, ignoring the UV stabilizer(s) and the other additives mentioned below, is preferably comprised of at least 80% by weight, and particularly preferably at least 90% by weight, and ideally at least 97% by weight, of polyester. Materials suitable here are inter alia polyesters made of ethylene glycol and terephthalic acid (=polyethylene terephthalate, PET), made of ethylene glycol and naphthalene-2,6-dicarboxylic acid (=polyethylene 2,6-naphthalate, PEN), made of 1,4-bishydroxymethylcyclohexane and terephthalic acid (=poly (1,4-cyclohexanedimethylene terephthalate), PCDT), or else made of ethylene glycol, naphthalene-2,6-dicarboxylic acid and biphenyl-4,4'-dicarboxylic acid (=polyethylene 2,6-naphthalate bibenzoate, PENBB), and polyesters made of isophthalic acid and ethylene glycol, or else of any desired mixture of the carboxylic acids and diols mentioned.

Preference is given to polyesters comprised of at least 90 mol %, particularly preferably at least 95 mol % (based on the diol units), of ethylene glycol units and preferably at least 90 mol %, particularly preferably at least 95 mol % (based on the dicarboxylic acid units) of the total of terephthalic acid units and naphthalene-2,6-dicarboxylic acid units. Ideally, more than 96.5 mol % derive from the monomer units mentioned. Within these limits particularly high gas barriers and aroma barriers are achieved in the film, and in many applications these are necessary in addition to the UV protection. The remaining monomer units derive from other aliphatic, cycloaliphatic or aromatic diols and, respectively, dicarboxylic acids.

Examples of suitable other aliphatic diols are diethylene glycol, triethylene glycol, and aliphatic glycols of the general formula HO—$(CH_2)_n$—OH, where n is preferably smaller than 10.

In one preferred embodiment, the polyester contains at least 0.3% by weight, particularly preferably at least 1% by weight, and ideally at least 2% by weight, of naphthalenedicarboxylic-acid-derived monomer units. Because the naphthalenedicarboxylic acid units have intrinsic UV absorption, this embodiment can achieve a saving in the cost of stabilizer which does not correspond to the formula I.

It is moreover possible that the polymer for the film comprises up to 20% by weight of other polymers, such as polyolefins, (e.g. COCs, polypropylene, etc.), polyamides, or polyetherimides. However, it is preferable that this proportion is below 10% by weight, and it is particularly preferable that the polymer is comprised of 100% by weight of the abovementioned polyesters.

The film can also comprise conventional additives, e.g. stabilizers and/or antiblocking agents, which do not correspond to the abovementioned UV stabilizers. If these additives are present it is preferable that they are used in the outer layers (layers A and C). They can be conventional additives, such as free-radical scavengers/heat stabilizers (e.g. IRGANOX®, for example IRGANOX® 1010) and/or antiblocking agents, or white pigments, such as $TiO_2$ or $BaSO_4$. They are usually added to the polymer. Examples of stabilizers used are phosphorus compounds, such as phosphoric acid or phosphoric esters.

Typical antiblocking agents are inorganic and/or organic particles, for example calcium carbonate, crystalline or amorphous silica ($SiO_2$), talc, magnesium carbonate, barium carbonate, calcium sulfate, lithium phosphate, calcium phosphate, magnesium phosphate, aluminum oxide, aluminum silicates, LiF, the calcium, barium, zinc or manganese salts of the dicarboxylic acids used, kaolin, or crosslinked polystyrene particles, crosslinked PMMA particles, or crosslinked acrylate particles.

Other antiblocking agents that can be selected are mixtures of two or more different antiblocking agents, and mixtures of antiblocking agents of identical composition but different particle size. The respective advantageous concentrations of the antiblocking agents can be added to the individual layers, e.g. by way of the polyester (addition in the form of glycolic dispersion during the polycondensation process), or these agents can be added by way of masterbatches during the extrusion process. The concentrations of the antiblocking agents (based on the respective layer in which they are used) are usually not above 5% by weight, preferably not above 3% by weight, and particularly preferably not above 1% by weight.

In one preferred embodiment, from 0.01 to 1% by weight of free-radical scavengers (antioxidants) is added, preferably from 0.01 to 0.1% by weight. For a selection see DE 101 35 795, (whose United States equivalent is United States Patent Application Publication No 2002/083641A1, hereby incorporated by reference herein) page 7, point 1 (corresponding to Paragraphs 0072 through 0091 of United States Patent Application Publication No. 2002/083641A1). Materials that have proven particularly suitable are IRGANOX® 1010 (CAS No. 6683-19-8) or the stabilizer with the CAS No. 065140-91-2 from Ciba SC, Switzerland.

The transparency of the film at 400 nm is below 90%, and preferably below 85%, and transparency at 390 nm is below 50%, preferably below 45%, and particularly preferably below 40%, and at 360 nm transparency is below 20%, preferably below 10%, and particularly preferably below 6%, and at 330 nm transparency is below 30%, preferably below 15%, and particularly preferably below 10%. Transparency at 400 nm is moreover above 3% and preferably above 10%, and particularly preferably above 20%. If transparency at 400 nm is too low (i.e. below 3%), the film has an increased level of yellow tinge.

In the preferred applications, the film serves as UV protection for materials located under/behind the film (as seen from the source of UV radiation). However, particularly in packaging applications, protection from light is not the only significant factor here, and a high gas/aroma/solvent barrier is also highly important for the durability of the materials located under the film. In order to improve this property, it has proven advantageous that the modulus of elasticity of the film is greater than 3000 N/mm$^2$ and preferably greater than 3500 N/mm$^2$, and particularly preferably >4100 N/mm$^2$, longitudinally and transversely. In one usual embodiment, the F5 values (force at 5% tensile strength) longitudinally and transversely are above 70 N/mm$^2$ and preferably above 90 N/mm$^2$. These mechanical properties can by way of example be obtained via suitable biaxial stretching of the film (see description of process).

The longitudinal and transverse shrinkage of the film of the invention at 150° C. is usually below 5%, preferably below 4%, and particularly preferably below 3%. In this embodiment of the invention, the expansion of the film at 100° C. is also usually less than 3%, preferably less than 1%, and particularly preferably less than 0.3%. This dimensional stability can by way of example be obtained via suitable heat-setting and relaxation of the film prior to wind-up (see description of process). Within the shrinkage/expansion ranges mentioned, the film can be printed with high registration accuracy.

In another preferred embodiment, at least one side of the film, has been coated with an adhesion promoter for printing inks. Examples of suitable coatings are acrylates or copolyesters having sulfoisophthalic acid contents >0.2% by weight.

In another preferred embodiment, the film is single-side sealable, and the sealable layer here is preferably coextruded with the other layers. If a copolyester is used for the sealable layer, the composition of this differs from the preferred composition mentioned in the introduction for the polyester of the film, in respect of the ranges mentioned for the total amount of ethylene glycol units and terephthalic acid units and naphthalene-2,6-dicarboxylic acid units; however, the other layers of the film remain within the limits mentioned. Suitable sealable layers are known and are described by way of example in the following specifications: US-A-2009/061138, US-A-2009/061137, WO-A-2002/070606, EP-A-1529799, (whose United States equivalent is United States Patent Application Publication No. 2005/121822), EP-A-1380414, (whose United States equivalent is United States Patent Application Publication No. 2004/009342), EP-A-0849075, (whose United States equivalent is U.S. Pat. No. 5,955,181). The film with sealable layer has excellent suitability as lid film for trays in packaging applications. In one particularly preferred embodiment, the sealable layer comprises no UV absorber of formula I, since there is an increased level of migration of low-molecular-weight compounds from said layers into the contents located thereunder.

In one preferred embodiment, the haze of the film is below 6%, particularly preferably below 5%, and ideally below 4%. The low haze leads to a particularly brilliant appearance of printing inks when they are seen through the film, and provides a particularly good view of material located thereunder. Said haze can be achieved by using only those UV absorbers which are capable of good binding into the polyester matrix. The respectively preferred representatives of the abovementioned classes of substances give the good haze values mentioned. Another advantageous factor for achieving said haze values is that the content of particles (e.g. antiblocking agents) with $d_{50}$>0.7 µm is less than 2% by weight and preferably less than 1% by weight (based on the respective layer).

Process

The polyester matrix polymers of the individual layers are produced via polycondensation, either starting from dicarboxylic acids and diols ("PTA process") or else starting from the esters of the dicarboxylic acids, preferably the dimethyl esters, and from diols ("DMT process"). Polyethylene terephthalates that can be used preferably have SV values in the range from 600 to 900, and for polyethylene 2,6-naphthalates the values are about 500 to 800.

Inorganic particles or crosslinked organic particles can be added before the polyester completes its production process. For this, the particles are dispersed in ethylene glycol, ground if appropriate, and decanted, etc., and added to the reactor, either in the (trans)esterification step or in the polycondensation step. As preferred alternative, a concentrated polyester masterbatch comprising particles or comprising additives can be produced in a twin-screw extruder and can be diluted with particle-free polyester during the film-extrusion process. Another method consists in direct addition of particles and additives during the film-extrusion process in a twin-screw extruder.

Non-crosslinked organic particles are either processed in a twin-screw extruder to give a masterbatch or added directly during the film-extrusion process.

Masterbatch technology can be used for addition of the UV stabilizers to the film. For this, a polyester is melted in a twin-screw extruder, and the UV stabilizer is added. The mixture is then extruded through a pelletizing die, and quenched in a water bath, and pelletized. It has proven advantageous that the contents of UV stabilizer in the masterbatch are from 1 to 33% by weight, preferably from 5 to 25% by weight, and particularly preferably from 10 to 20% by weight. Lower contents are rather uneconomic, and from about 25% by weight the binding of the UV stabilizer into the polyester matrix is inadequate, and above 33% by weight this leads to visible "exudation".

The UV stabilizers can also be added directly during the film-production process. For this, the appropriate amounts of the stabilizer are fed directly to the extruder. However, this gives genuinely good dispersion results only in multiscrew extruders (at least two).

It has moreover proven advantageous to cover the extruder intake with a stream of inert gas (e.g. nitrogen or argon).

It is also possible to add the UV stabilizers, like the particles, during polycondensation of the polymers, but this method is less preferred because stabilizer is lost during this process through thermal degradation and losses associated with gas evolution, and there is mostly significant yellowing of the polymers.

If single-screw extruders are used, it has then proven advantageous to predry the polyesters. If a twin-screw extruder with vent zone is used, the drying step can be omitted.

The polymer or polymer mixture of the layer or, in the case of multilayer films, of each of the layers, is first compressed and plasticized in extruders. The melt(s) is/are then extruded through an extrusion or coextrusion die to give flat melt films, and the material is forced through a flat-film die, and drawn off on a chill roll and on one or more take-off rolls, whereupon the film cools and solidifies. During the extrusion process it has proven advantageous to avoid exceeding temperatures of 305° C., and even more advantageous to avoid exceeding temperatures of 300° C. (avoidance of yellowing).

The film of the invention is preferably biaxially oriented, i.e. biaxially stretched. The biaxial orientation process for the film is most frequently carried out sequentially.

This orientation process is preferably carried out first longitudinally (i.e. in machine direction=MD) and then transversely (i.e. perpendicularly to machine direction=TD) The longitudinal orientation process can be carried out with the aid of two rolls running at different speeds corresponding to the desired stretching ratio. For the transverse orientation process, an appropriate tenter frame is generally used.

It is also possible, but not essential, to use simultaneous stretching of the film instead of the sequential stretching process.

The temperature at which the stretching process is carried out can vary relatively widely, and depends on the properties desired in the film. The longitudinal stretching process is generally carried out within the temperature range from 80 to 130° C. (heating temperatures from 80 to 130° C.), and the transverse stretching process is generally carried out in the temperature range from 90° C. (start of the stretching process) to 140° C. (end of the stretching process). In order to achieve the film properties desired, it has proven advantageous that the stretching temperature (in MD and TD direction) is below 125° C., and preferably below 118° C. The longitudinal stretching ratio is in the range from 2.0:1 to 5.5:1, preferably from 2.2:1 to 5.0:1. The transverse stretching ratio is generally in the range from 2.4:1 to 5.0:1, preferably from 2.6:1 to 4.5:1.

Prior to the transverse stretching process, one or both surfaces of the film can be coated in-line by the processes known per se. In-line coating can by way of example give improved adhesion between a metal layer or a printing ink and the film, or can improve the antistatic performance or the processing performance of the film. If the external coextruded layers do not comprise inorganic particles for improvement in slip properties and winding properties, a particle-containing coating can be applied at this point.

In the heat-setting process that follows, the film is usually kept for a period of about 0.1 to 10 s under tension at a temperature of from 150 to 250° C. and, in order to achieve the preferred values for shrinkage and expansion, relaxed transversely by at least 1%, preferably at least 3%, and particularly preferably at least 4%. Said relaxation preferably takes place in the temperature range from 150 to 190° C. It is preferable that <25% and >5% of the entire relaxation occurs within the first 25% of the relaxation time. The film is then wound up in the usual way.

The production process for the film ensures that a concentration of from 20 to 60% by weight, based on the total weight of the film, of regrind can be reintroduced into the extrusion process without any significant resultant adverse effect on the physical and optical properties of the film.

The film of the invention features very good UV absorption in the range from 320 to 400 nm, and has excellent suitability for protecting goods from UV radiation. Examples inter alia are the use as transparent lid film, e.g. on trays for the packaging of meat products and sausage products, of cheese, of colored pasta, of animal feed, or else of other food- or drink-products, giving improved shelf life of the packaged products.

The test methods used to characterize the raw materials and the films were as follows:

Measurement of Average Particle Diameter $d_{50}$

Average diameter $d_{50}$ is determined by means of a laser in a HORIBA® LA 500, using laser diffraction (examples of other test equipment being the Malvern MASTERSIZER® or the Sympathec HELOS®, which use the same principle of measurement). For the test, the specimens are placed in a cell with water and this is then inserted into the test equipment. A laser is used to scan the dispersion, and particle size distribution is determined from the signal via comparison with a calibration curve. Two parameters characterize the particle size distribution: the median value $d_{50}$ (=a measure of the average) and the "SPAN98" (=a measure of particle diameter scattering). The test procedure is automatic and also includes mathematical determination of the $d_{50}$ value. The $d_{50}$ value here is defined as determined from the (relative) cumulative particle size distribution curve: the intersection of the 50% ordinate value with the cumulative curve provides the desired $d_{50}$ value on the abscissa axis.

Primary Particle Size of Nanoparticles (e.g. AEROSIL® and NYACOL®)

The average size of the primary particles is determined on transmission electron micrographs (TEMs) of the product in question. If the specimen takes the form of film or polymer pellets, the TEM study must be carried out on microtome sections.

UV/Vis Spectra and Transparency at Defined Wavelength

The films are tested in transmission mode in a UV/Vis spectrometer (LAMBDA® 12) from Perkin Elmer, USA. Air is used as background. Transparency is read off at the desired wavelength.

Mechanical Properties

Modulus of elasticity, ultimate tensile strength, tensile strength at break, and $F_5$ value are measured longitudinally and transversely to ISO 527-1 and 527-3 (type 2 specimen) with the aid of a tensile tester (010 from Zwick, DE).

Shrinkage

Heat-shrinkage is determined on square film samples with edge length 10 cm. The specimens are measured precisely (edge length $L_0$), heated for 15 minutes in a convection oven at 150° C., and then measured precisely at room temperature (edge length L). The following equation gives the shrinkage:

Shrinkage [%]=100·$(L_0-L)/L_0$

Expansion

Thermal expansion is determined on square film samples of edge length 10 cm. The specimens are measured precisely (edge length $L_0$), heated for 15 minutes in a convection oven at 100° C., and then measured precisely at room temperature (edge length L). The following equation gives the expansion:

Expansion [%]=100·$(L-L_0)/L_0$

SV Value (Standard Viscosity)

Standard viscosity SV (DCA) is measured by a method based on DIN 53 726, at 25° C. at 1% concentration in dichloroacetic acid. The dimensional SV value is determined as follows from relative viscosity ($\eta_{rel}$):

SV (DCA)=$(\eta_{rel}-1)\cdot 1000$

Intrinsic viscosity (IV) correlates with the standard viscosity as follows:

IV (DCA)=$[\eta]$=6.907·$10^{-4}$SV (DCA)+0.063096 [dl/g]

Haze

The haze is determined to ASTM D1003-61 (method A) by a HAZE-GARD® PLUS from BYK-Gardner GmbH, Germany.

Fluorescence

Fluorescence is determined in reflection mode by using a Lambda 12 and an Ulbricht sphere, against a black background. Fluorescence behavior is acceptable if the reflectance measured at (excitation wavelength of) 380 nm is smaller than 38%, and is good if the value is smaller than 30%, and is very good if the value is smaller than 20%.

EXAMPLES

The polymer mixtures for each layer were melted in a twin-screw extruder and combined in an adapter and, via a flat-film die, applied electrostatically to a chill roll controlled to a temperature of 60° C. The temperature during the extrusion process was at most 298° C. The following conditions were then used for longitudinal, and then transverse, stretching of the film:

| | | | |
|---|---|---|---|
| Longitudinal stretching | Heating temperature | 75-115 | ° C. |
| | Stretching temperature | 115 | ° C. |
| | Longitudinal stretching ratio | 3.7 | |
| Transverse stretching | Heating temperature | 100 | ° C. |
| | Stretching temperature | 110 | ° C. |
| | Transverse stretching ratio | 4.0 | |
| Setting | Temperature | 237-150 | ° C. |
| | Duration | 4 | sec |
| | Relaxation in TD at from 200-150 ° C. | 7 | % |
| | Relaxation time | 2 | sec |
| | Relaxation in first 25% of relaxation time | 1 | % |

All of the polyesters used were comprised of more than 96.5 mol % of ethylene glycol units and terephthalic acid units (within the polyester content). The SV values for all of the polymers used were from 740 to 880. The following polymers and masterbatches were used in the examples:

Masterbatch MB1

10% by weight of N-(2,6-diisopropylphenyl)-6-[4-(1,1,3,3-tetramethylbutyl)phenoxy]-1H-benzo[d,e]isoquinoline-1,3(2H)-dione (S-PACK® from BASF, Germany) were pelletized together with 96% by weight of polyethylene terephthalate from Invista, DE, in a conventional twin-screw extruder.

Masterbatch MB2

20% by weight of CYASORB® 3638 from Cytec were pelletized together with 80% by weight of polyethylene terephthalate from Invista, DE, in a conventional twin-screw extruder.

Masterbatch MB3

20% by weight of TINUVIN® 1577 from Ciba were pelletized together with 80% by weight of polyethylene terephthalate from Invista, DE, in a conventional twin-screw extruder.

Masterbatch MB4

1.25% by weight of $SiO_2$ (AEROSIL® TT600 from Evonik) and 1% by weight of $SiO_2$ (SYLOBLOC® 44H from Grace) in polyethylene terephthalate from Invista, DE. The respective pigment dispersions were added after the transesterification process. The primary grain size of AEROSIL® was 40 nm. The $d_{50}$ of SYLOBLOC® was 2.5 μm.

Polymer P1

100% by weight of polyethylene terephthalate from Invista, DE.

Comparative Example 1

A monofilm was produced as stated above at a thickness of 12 μm:

raw material mixture: 20% by weight of MB1/5% by weight of MB4/75% by weight of P1.

Example 1

An ABA film was produced as stated above with base-layer thickness 8.5 μm and outer layers A respectively of thickness 1.75 μm.

Outer layer A: 8% by weight of MB4/92% by weight of P1

Base layer B: 6% by weight of MB2/24% by weight of MB1/70% by weight of P1

Example 2

An ABA film was produced as stated above with base-layer thickness 8.5 μm and outer layers A respectively of thickness 1.75 μm.

Outer layer A: 8% by weight of MB4/10% by weight of MB3/82% by weight of P1

Base layer B: 6% by weight of MB2/24% by weight of MB1/70% by weight of P1

Table 1 collates the properties of the films from the examples.

Whereas the films from Examples 1 and 2 have all of the properties demanded by the application, the film from Comparative Example 1, comprising no costabilizer, has certain shortcomings. Examples that may be mentioned of these shortcomings are the UV transparency in particular at relatively low wavelengths, and the relatively high level of fluorescence.

TABLE 1

Properties of examples

| Measured value | Comparative example 1 | Example 1 | Example 2 |
|---|---|---|---|
| Thickness | 12 μm | 12 μm | 12 μm |
| Concentration of I ($C_I$) | 2% by wt. | 1.7% by wt. | 1.7% by wt. |
| Standardized concentration of I ($C_{nI}$) | 24% by wt. · μm | 20.4% by wt. · μm | 20.4% by wt. · μm |
| Concentration of all of the co-stabilizers, based on concentration of I | 0% by wt. | 50% by wt. | 84% by wt. |
| Concentration of UV stabilizer in MB | 10% by wt. | 10 and, respectively, 20% by wt. | 10 and, respectively, 20% by wt. |
| Transpa ency at 400 nm | 60% | 63% | 62% |
| Transparency at 390 nm | 28% | 32% | 31% |
| Transparency at 360 nm | 13% | 4% | 2% |
| Transparency at 330 nm | 36% | 4% | 2% |
| Fluorescence for excitation wavelength 380 nm | 42% | 35% | 19% |
| Haze | 4.5 % | 3.9 % | 3.8% |
| Shrinkage 150° C./15 min (MD/TD) | 1.5 %/0.4% | 1.4 %/0.3% | 1.5%/0.3 % |
| Expansion 100° C. (MD/TD) | 0.18 % | 0.16 % | 0.17% |
| Modulus of elasticity (MD/TD) F5 value (MD/TD) | 4500 N/mm²/ 4900 N/mm² 100 N/mm²/ 105 N/mm² | 4500 N/mm²/ 4900 N/mm² 100 N/mm²/ 105 N/mm² | 4500 N/mm²/ 4900 N/mm² 100 N/mm²/ 105 N/mm² |

That which is claimed:

1. A polyester film comprising at least one UV stabilizer of the formula I,

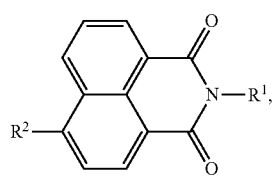

wherein
R1 is hydrogen, alkyl, alkenyl, cycloalkyl, cycloalkenyl, heterocycloalkyl, aryl, or heteroaryl, and
R2 is a moiety which contains at least one π-electron system, which contains a carbon atom and at least one further atom selected from carbon, oxygen, and nitrogen, where the moiety R2 contains at least one atom different from carbon; and wherein
the film-thickness-standardized concentration of said UV stabilizer(s) of formula I ($C_{nI}$), when two or more different compounds of formula I are used $C_{nI}$ means the total concentration of all of the compounds of formula I, in said film complies with the following Equation 1:

$$C_{nI}=C_I \cdot d \qquad \text{Equation 1}$$

where
d=film thickness in μm;
$C_I$=total concentration of all of the compounds of formula I in said film in % by weight;
$C_{nI}$=standardized total concentration of all of the compounds of formula I in said film in % by weight·μm
and is $C_{nI} \geq 4$% by weight·μm and ≤60% by weight·μm;
said film comprising at least one further UV absorber which does not correspond to the formula I having at least one absorption maximum above 340 nm, present in an amount of 5 to 400 by weight based on of the amount of Formula I,
wherein the F5 values (force at 5% tensile strength of said film), longitudinally (MD) and transversely (TD) are >70 N/mm² and said film does not visibly fluoresce within the visible region from 400 to 700 nm.

2. The polyester film as claimed in claim 1, wherein the further UV absorber which does not correspond to the formula I has been selected from triazines, benzophenones, diphenylcyanoacrylates, benzotriazoles, or benzoxazines or combinations of these.

3. The polyester film as claimed in claim 1, wherein the further UV absorber which does not correspond to the formula I consists of triphenyltriazine derivatives or benzoxazines or combinations of these.

4. The polyester film as claimed in claim 1, wherein the further UV absorber which does not correspond to the formula I has been selected from 2-(4,6-diphenyl-1,3,5-triazine-2-yl)-5-[(hexyl)oxyl]phenol or 2,2'(1,4-phenylene)bis[4H-3,1-benzoxazine-4-one] or a combination thereof.

5. The polyester film as claimed in claim 1, wherein the molar mass of the substituent R1 is >29 g/mol.

6. The polyester film as claimed in claim 1, wherein the UV stabilizer is a compound of the formula I-C,

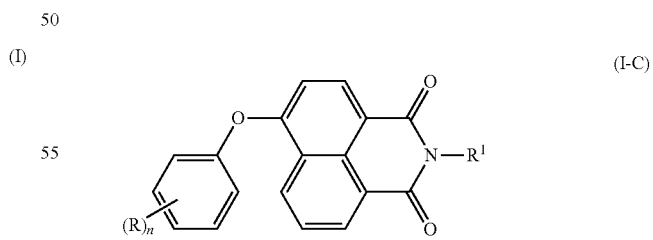

where
R1 is defined as in claim 1,
R is identical or different $C_1$-$C_{12}$-alkyl groups; and
n is 1, 2, 3, 4, or 5.

7. The polyester film as claimed in claim 1, wherein the UV stabilizer is a compound of the formula

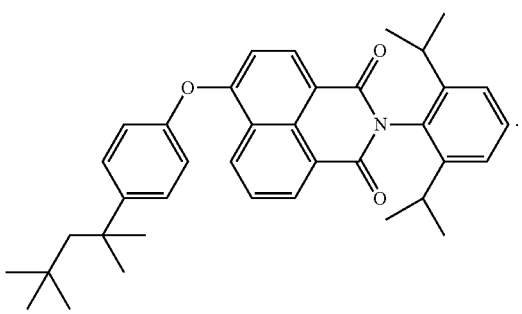 [SMILES: CC(C)c1cccc(C(C)C)c1N1C(=O)c2cccc3c(Oc4ccc(C(C)(C)CC(C)(C)C)cc4)ccc(c23)C1=O]

8. The polyester film as claimed in claim 1, wherein said film has three layers and is comprised of two external outer layers and a base layer arranged between the two outer layers, said base layer comprising said UV absorber of the formula I and at least one further UV absorber not corresponding to the formula I.

9. The polyester film as claimed in claim 8, wherein the two external outer layers of the film comprise no UV absorber of the formula I.

10. The polyester film as claimed in claim 9, wherein at least one external outer layer comprises at least one further UV absorber not corresponding to the formula I.

11. The polyester film as claimed in claim 9, wherein the base layer alone comprises at least one further UV absorber not corresponding to the formula I.

12. A process for producing a single- or multilayer polyester film as claimed in claim 1 comprising
compressing and plastifying a polymer or a polymer mixture of the respective layer of the polyester film in an extruder to form a melt(s),
extruding the melt(s) through a flat-film extrusion or coextrusion die to give flat melt-film,
drawing the flat melt-film off on a chill roll and on one or more take-off rolls to cool the flat melt-film and solidify the flat melt-film into a prefilm,
monoaxially or biaxially orienting the prefilm,
heat-setting and winding up the oriented film,
wherein said film comprises at least one UV stabilizer of the formula I as claimed in claim 1 and further comprises at least one further UV absorber not corresponding to the formula I.

13. Packaging film comprising a polyester film as claimed in claim 1.

14. Packaging film as claimed in claim 13, wherein said packaging film is food or drink packaging film.

15. Packaging film as claimed in claim 13, wherein said packaging film is meat product, sausage product, cheese, colored pasta, or animal feed packaging film.

16. Packaging film as claimed in claim 13, wherein said packaging film is transparent lid film.

17. Packaging film as claimed in claim 16, wherein the transparent lid film is lid film for trays.

18. A polyester film comprising at least one UV stabilizer of the formula I,

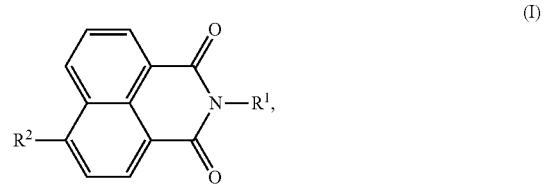

wherein
  R1 is hydrogen, alkyl, alkenyl, cycloalkyl, cycloalkenyl, heterocycloalkyl, aryl, or heteroaryl, and
  R2 is a moiety which contains at least one π-electron system which contains a carbon atom and at least one further atom selected from carbon, oxygen, and nitrogen, where the moiety R2 contains at least one atom different from carbon;
  said film comprising at least one further UV absorber which does not correspond to the formula I having at least one absorption maximum above 340 nm;
  said film having a transparency which is
  (a) below 90% at 400 nm,
  (b) below 50% at 390 nm,
  (c) below 20% at 360 nm,
  (d) below 30% at 330 nm, and
  (e) above 3% at 400 nm,
  said film further comprising one or more optional additives consisting of free-radical scavengers, heat stabilizers, antiblocking agents or white pigments,
  and said film does not visibly fluoresce within the visible region from 400 to 700 nm.

* * * * *

UNITED STATES PATENT AND TRADEMARK OFFICE
CERTIFICATE OF CORRECTION

| | | |
|---|---|---|
| PATENT NO. | : 8,945,703 B2 | Page 1 of 1 |
| APPLICATION NO. | : 12/832126 | |
| DATED | : February 3, 2015 | |
| INVENTOR(S) | : Holger Kliesch et al. | |

It is certified that error appears in the above-identified patent and that said Letters Patent is hereby corrected as shown below:

In the Claims

Column 14

Claim 1, Line 22   insert -- % -- after 400

Claim 4, Line 42   the second formula should read 2,2'-(1,4-phenylene)bis[4H-3,1-benzoxazine-4-one]

Signed and Sealed this
Twenty-sixth Day of May, 2015

Michelle K. Lee
*Director of the United States Patent and Trademark Office*